US006535509B2

(12) United States Patent
Amicangioli

(10) Patent No.: US 6,535,509 B2
(45) Date of Patent: *Mar. 18, 2003

(54) TAGGING FOR DEMULTIPLEXING IN A NETWORK TRAFFIC SERVER

(75) Inventor: Anthony D. Amicangioli, Newton, MA (US)

(73) Assignee: Infolibria, Inc., Waltham, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/404,091

(22) Filed: Sep. 23, 1999

(65) Prior Publication Data

US 2002/0071422 A1 Jun. 13, 2002

Related U.S. Application Data

(60) Provisional application No. 60/102,066, filed on Sep. 28, 1998.

(51) Int. Cl.[7] .............................................. H04L 12/28
(52) U.S. Cl. ...................................... 370/389; 370/465
(58) Field of Search ................................ 370/389, 390, 370/392, 397, 396, 398, 399, 401, 402, 409, 536, 542, 465

(56) References Cited

U.S. PATENT DOCUMENTS

| 4,245,343 A | 1/1981 | Frey ............................. 371/11 |
| 4,897,781 A | 1/1990 | Chang et al. ................ 364/200 |
| 5,261,069 A | 11/1993 | Wilkinson et al. .......... 395/425 |

(List continued on next page.)

FOREIGN PATENT DOCUMENTS

| EP | 0 397 196 A2 | 11/1990 |
| GB | 2 294 132 A | 4/1996 |
| WO | WO 97/28505 | 8/1997 |
| WO | WO 98/17039 | 4/1998 |
| WO | WO 99/48003 | 9/1999 |

OTHER PUBLICATIONS

Chankhunthod, A., et al. (Computer Science Dept., Univ. of S. Calif.) and Schwartz, M. F., et al. (Computer Science Dept., Univ. of Colorado–Boulder), "A Hierarchical Internet Object Cache." (No Date Given).

Schwartz, M.F., et al., "An Architecture for Discovering and Visualizing Characteristics of Large Internets," Dept. of Computer Science, Univ. of Colorado, Boulder, Colorado 80309–0430, CU–CS–520–91 pp. 1–12 (Feb. 1991).

Guyton, J.D., et al., "Locating Nearby Copies of Replicated Internet Servers," SIGCOMM '95, pp. 288–298 (1995).

Seltzer, M., et al., "An Implementation of a Log–Structured File System for UNIX," 1993 Winter USENIX, pp. 307–326 (Jan. 25–29, 1993).

Tewari, et al., UTS Technical Report: *"Beyond Hierarchies: Design Considerations for Distributed Caching on the Internet"*, Department of Computer Sciences, The University of Texas at Austin, XP–002130410.

(List continued on next page.)

*Primary Examiner*—Wellington Chin
*Assistant Examiner*—Brenda Pham
(74) *Attorney, Agent, or Firm*—Hamilton, Brook, Smith & Reynolds, P.C.

(57) ABSTRACT

The present invention involves a method and apparatus for tagging messages to reduce redundant processing of data at two different, but linked, processing units. A first message processing unit assigns a tag to a message based upon its content, where the message and corresponding tag are passed along for further processing at a second network processing unit. The second processing unit decodes the message to identify the tag and, therefore, the process associated with a particular message. In this way, a stream of related messages are identified by the assigned tag, simplifying the process of directing the messages to the appropriate process at a is second processing unit.

47 Claims, 13 Drawing Sheets

U.S. PATENT DOCUMENTS

| | | | |
|---|---|---|---|
| 5,282,201 | A | 1/1994 | Frank et al. ............... 370/94.1 |
| 5,317,198 | A | 5/1994 | Husbands .................. 307/116 |
| 5,500,860 | A | 3/1996 | Perlman et al. ........... 370/85.13 |
| 5,511,208 | A | 4/1996 | Boyles et al. ............... 395/800 |
| 5,521,913 | A | 5/1996 | Gridley ..................... 370/58.2 |
| 5,592,626 | A | 1/1997 | Papadimitriou et al. ..................... 395/200.09 |
| 5,598,581 | A | 1/1997 | Daines et al. ............... 392/872 |
| 5,640,504 | A | 6/1997 | Johnson, Jr. ........... 395/182.02 |
| 5,708,776 | A | 1/1998 | Kikinis .................. 395/185.08 |
| 5,740,370 | A | 4/1998 | Battersby et al. ...... 395/200.49 |
| 5,754,774 | A | 5/1998 | Bittinger et al. ....... 395/200.33 |
| 5,758,072 | A | 5/1998 | Filepp et al. ............ 395/200.5 |
| 5,774,660 | A | 6/1998 | Brendel et al. ........ 395/200.31 |
| 5,787,470 | A | 7/1998 | DeSimone et al. ......... 711/124 |
| 5,933,849 | A | 8/1999 | Srbljic et al. ............... 711/118 |
| 6,006,264 | A | 12/1999 | Colby et al. ................ 709/226 |
| 6,084,855 | A | 7/2000 | Soirinsuo et al. |
| 6,167,052 | A * | 12/2000 | McNeill et al. ............. 370/399 |
| 6,167,438 | A | 12/2000 | Yates et al. .................. 709/216 |
| 6,185,619 | B1 | 2/2001 | Joffe et al. .................. 709/229 |
| 6,195,703 | B1 | 2/2001 | Blumenau et al. .......... 709/238 |
| 6,205,481 | B1 | 3/2001 | Heddaya et al. |
| 6,286,061 | B1 * | 9/2001 | Ross ........................... 710/33 |
| 6,311,216 | B1 | 10/2001 | Smith et al. ................ 709/226 |
| 6,327,242 | B1 * | 12/2001 | Amicangioli et al. ....... 370/216 |
| 6,351,775 | B1 | 2/2002 | Yu ............................. 709/238 |

OTHER PUBLICATIONS

Mourad, A., et al., "*Scalable Web Server Architectures,*" Proceedings IEEE Symposium on Computers and Communications, Jul. 1, 1997 XP000199852.

Ilvesmaki, M., et al., "*Flow Classification Schemes in Traffic–Based Multilayer IP Switching–Comparison between Conventional and Neural Approach,*" Computer–Communications, GB, Butterworths & Co., Publishers LTD., vol. 21, No. 13, Sep. 1, 1998, pp. 1184–1194, XP004146579.

Heddaya, A. et al., "WebWave: Globally Load Balanced Fully Distributed Caching of Hot Published Documents," International Conference on Distributed Computing Systems, 1900, pp. 160–168 (1997).

Tennenhouse, David L., et al., "Towards an Active Network Architecture," Multimedia Computing and Networking, San Jose, CA, Jan. 1996.

Ortiz, Jr., Sixto, "Active Networks: The Programmable Pipeline," *Technology News*, pp. 19–21 (Aug. 1998).

"Canes: Composable Active Network Elements," Active Networking, http://www.cc.gatech.edu/projects/canes, p. 1, (Sep. 18, 1998).

"Liquid Software: A New Paradigm for Networked Systems," The University of Arizona, Department of Computer Science, Current Research Projects, http://www.cs.arizona.edu/liquid/, pp. 1–2, (Sep. 18, 1998).

"Smart Packets," http://www.net–tech.bbn.com/smtpkts/smtpkts–index.html, p. 1 (Sep. 18, 1998).

* cited by examiner

| MAC ADDRESS | PORT FIELD | | | S/D̄ | AGE |
|---|---|---|---|---|---|
| " | $H_1$ | $E_0$ | $E_1$ | | |
| MAC A | 0 | 1 | 0 | 0 | — |
| ⋮ | | | | | |
| MAC HOST | 1 | 0 | 0 | 1 | — |
| MAC BROADCAST | 1 | 1 | 1 | 1 | — |
| ⋮ | | | | | |

| $IP_s$ | $IP_d$ | $T_s$ | $T_D$ | PORT |
|---|---|---|---|---|
| 421 | 422 | 423 | 424 | 425 |

| IP ADDRESS | MASK | RATING | PORT |
|---|---|---|---|
| 431 | 432 | 433 | 434 |

TAGGING FOR DEMULTIPLEXING IN A NETWORK TRAFFIC SERVER

CROSS-REFERENCE TO RELATED APPLICATIONS

This application claims the benefit of a prior United States Provisional Application Serial No. 60/102,066 filed Sep. 28, 1998 entitled "Offloading Server Processor and Bus with Increased Network processing Power in the Network Interface Card," the entire teachings of which are incorporated herein by reference.

BACKGROUND OF THE INVENTION

Computer network industry analysts and experts agree that data traffic over large networks and, in particular, the Internet, is presently so heavy that the very nature in the way in which it is possible to use such networks may require fundamental changes. These difficulties are no doubt the result of continued exponential increases in the number of users, as well as in the number of large document files that these users expect to transfer. As a result of this unprecedented demand in the need for network bandwidth, Internet Service Providers (ISPs), backbone providers, and other carriers that provide the physical connections which implement the Internet face correspondingly unprecedented difficulty. This difficulty exists at all levels of network hierarchy, including the points of presence (POPs), central access nodes, network access points, and exchange points, such as metropolitan area exchanges.

To understand what has led to this situation, consider how the Internet is typically used. The most popular user environment, the World Wide Web, provides access to content on an equal basis through the use of the client and server communication model. In this structure, certain computers known as "servers" are used to store and provide information. Other computers in the network known as "clients" allow the users to view documents through the use of a computer program known as a browser that requests a copy of the document be sent from host servers down to the client. Documents are typically requested by the client browser program specifying an address which identifies the host server which stores the document. After the browser specifies a document such as by its so-called Internet Protocol (IP) address, the request is sent to a naming service in order to obtain instructions for how to establish a connection with the host server associated with the IP address. Once this connection is established, the server retrieves the document from its local disk and transmits the document over network to the client. The connection between the client and host server is then terminated.

A common solution for the present bottlenecks within the Internet is to deploy higher speed hardware. Such solutions include the deployment of digital subscriber line (xDSL) cable modem technology to speed up the physical layer communication paths between the end users and points of presence. Gigabit speed routers and optical fiber backbones are also being proposed to alleviate congestion within the network itself. At the server site, server clusters and load balancers are being deployed to assist with the dispatching of Web pages more efficiently.

While all of these solutions provide some expediency, each addresses only part of the problem and none provides an ultimate solution to the problem; the path between the client and server is only as fast or as slow as the slowest physical link.

As it turns out, much of the traffic on the Internet is redundant in the sense that different users request the same documents from the same servers over and over again. Therefore, it is becoming increasingly apparent that certain techniques, such as distributed document caching, may be deployed to reduce the demand for access to both the servers and to the network routing infrastructure. Document caching provides a way to intercept client requests for the same document with the cache serving copies of the original document to multiple client locations.

With a cache, the process for providing document files to the client computers changes from the normal process. In particular, when the client requests the connection, say to a given server, the intermediate cache server may instead be requested to obtain the document. While the document is being transmitted down to the client computer, a copy is stored at the intermediate cache server. Therefore, when another client computer connected to the same network path requests the same content as the first user, rather than requiring the request to travel all the way back to the host server, the request may be served from the local cache server.

However, cache techniques are typically sub-optimal in one way or another. For example, most Web browser programs have a built-in cache that keeps copies of recently viewed content within the client computer itself. If the same content is requested again, the browser simply retrieves it from local storage instead of going out to the network. However, when a browser cache services only one end user, content often expires before it can be reused.

A browser-redirected cache server may also be deployed to service multiple end users. Such a cache server is a separate computer that sits inside a gateway or other point of presence. End users configure their Web browsers to redirect all HTTP traffic to the cache server instead of the locations implied by the Uniform Resource Locators (URLs). The cache server then returns the requested Web page if it has a copy. Otherwise, it forwards the request to the originally specified server and saves a copy as the response flows back. Such a cache server therefore acts as a proxy, receiving all requests and examining them to determine if it can fulfill them locally.

However, even when using proxy servers, it is typically necessary to configure the client browser, proxy server, routers, or other network infrastructure equipment in order to cause the request messages to be redirected to the proxy server. This provides some configuration management difficulties in that reconfiguration of browsers typically requires administrative overhead on the part of the humans who manage the networks.

To improve the odds of locating desired content without having to traverse the entire Internet, local points of presence can be supported by additional caches placed deeper into the network, such as at peering centers. If a primary cache cannot satisfy a request, it queries a secondary cache which in turn may query a tierciery cache, and so forth. If none of the caches in the hierarchy has the desired content, the primary cache ultimately ends up forwarding the document request to the originally requested host.

These caching schemes also fall short in some way. Forced redirection of HTTP traffic turns such cache servers into single points of failure. If a cache server overloads or malfunctions, access to the network is blocked. Recovery is especially awkward with browser redirected caching since every end user's Web browser then has an explicit point to the broken server.

Forced redirection can also have a negative effect on network performance. Even if a browser is topologically closer to the real content server than to a cache server, all HTTP requests detour through the cache and any Web object not in the cache passes through the nearby router or switched twice—one when it travels from the originating server to the cache, and again as the cache forwards it back to the browser and furthermore passing messages from primary to secondary caches and back again at its noticeable latency and ultimately limits the scope of caching in larger networks.

Therefore, there is presently much controversy over the deployment of network caches for several reasons. Cache servers are, in particular, notoriously difficult to optimize. In certain configurations, they will quickly become overloaded in that the number of connections that they are expected to maintain with the user locations is more than the processing power can handle. Time spent determining whether to accept connections, cache documents, and/or refuse connections therefore overloads the cache server, which in turn reduces its performance on an exponential basis. In other situations, the cache servers are underloaded and not enough traffic is routed to them. They therefore represent a large investment of resources not providing optimum utilization and which are in effect underloaded.

SUMMARY OF THE INVENTION

The present invention involves tagging messages received at a network traffic interceptor to reduce redundant processing of messages. Received messages are analyzed and appropriately tagged at a message interceptor, where they are subsequently passed to a second processing unit for further processing. The tag appended or incorporated within a message provides a shorthand way of identifying messages associated with a particular connection.

In simple terms, a first message processing unit called a message redirector or message interceptor assigns a tag to a message based upon its content. The tag indicates how the message should be handled, such as identifying a TCP connection to which the message should be directed. After a message received at the redirector is tagged, the tagged message is subsequently passed along for further processing at a second message processing unit such as a cache server.

Accordingly, the second message processing unit need not decode the entire contents of the message to identify the connection associated with a particular message. Rather, the second message processing unit reads a tag associated with the message to determine a connection to which the message is directed. In this way, a stream of related messages are identified by a tag, simplifying the process of directing the messages to the appropriate state machine in the second processing unit such as a TCP state machine in a network traffic server.

In one embodiment, the techniques of the present invention are employed in distributed network systems. For example, a message redirector and cache server are combined for processing Web document request messages. A message redirector intercepts message flows intended for Web servers and passes the associated messages to the cache server, which then determines whether the requested information is stored in the cache server.

Preferably, information requests from client nodes on a network are originally intended for server nodes on a network, where an interceptor or redirector redirects the message to a data base manager maintaining duplicate copies of selected information available at server nodes on a network. If it is determined that the requested information, i.e., a web page, is located in the data base, the corresponding information in the data base is transmitted to the requesting party. Instead of receiving the information from the node on the network, the cache server provides the client node with information maintained in the cache server.

The cache server or data base manager, at any given time, processes many information requests so it is possible that the cache server is too busy to retrieve and transmit the requested information to a requesting client. If the cache server is too busy or the requested information is not stored in the cache server, the message flow is routed to the intended server on the network. In this case, the message redirector merely acts as a bridge so that the requesting node is supplied the requested information via communication between the requesting node and server on the network.

When a new connection is to be established for communication between the cache server and requesting node, a tag corresponding to the connection is assigned to the related stream of messages. The first and subsequent messages, i.e., a message flow, associated with a given connection are marked with the same tag to indicate that the series of messages is related to a particular connection such as a TCP connection between the cache server and requesting node.

Tagging or marking a particular message is done in a number of ways. In the preferred embodiment, the tag is overwritten in the Ethernet field or link layer of a message. Alternatively, the tag is appended to the message by the message redirector before it is directed to the cache server for further processing.

The message redirector and cache server, as mentioned, typically service many requests for information simultaneously. Therefore, an array of connection tracking objects are used to track active connections between the cache server and the many requesting nodes. A connection refers to a communication session between a client on the network and a corresponding TCP state machine running in the cache server and is a TCP connection. Multiple connections are simultaneously maintained by one processor for efficient use of hardware resources.

In one embodiment, multiple cache servers in communication with the redirector are deployed to support information requests. Hence, a connection tag further corresponds not only with the TCP state machine associated with a particular message, but also the cache server to which the message is directed. This is optionally achieved by storing the appropriate target cache server information, i.e., cache server servicing the request, in the corresponding connection tracking object so that a message can be properly forwarded by the redirector to the appropriate cache server.

To keep track of each connection, the message redirector and cache server both create a table of information for each active connection. For example, when it is determined that a request message will be serviced by the cache server, the message redirector allocates a connection tracking object corresponding to the connection. First, a connection tracking object is allocated and a corresponding tag is assigned to the given transaction. Second, the characteristics defining the transaction are stored in the object. Specifically, the TCP source and destination address and the IP source and destination address are stored in the object. Third, the type of protocol used to transfer information for a particular connection is stored in the object, i.e. TCP, UDP, etc.

Based on the information stored in the array of connection tracking objects, the message redirector checks newly received messages to determine whether a given message is associated with an active connection. In other words, the message redirector decodes the TCP and IP source and destination address of received messages to determine whether they pertain to an already active connection. This is done by comparing address information in the received message with information stored in the connection tracking objects. If there is a match, the message corresponds with a particular connection and the message is marked with the corresponding tag and forwarded with the tag to the cache server.

Because the cache server is capable of decoding each connection tag, further message processing is not required at the cache server in order to direct the message to the appropriate connection. In short, the tag allows the cache server to take a shortcut, directing the data in the message directly to the TCP state machine which is servicing the connection. Redundant processing of certain aspects of the message are, therefore, unnecessary.

New connection tracking objects are created based upon the content of a message. For example, the message redirector identifies new requests for Web pages based upon the type of message, such as a SYN message indicating that a node on the network is attempting to establish a new connection. For instance, the detection of a SYN message at the redirector indicates a new request for information stored in the cache server. This causes both the redirector and, upon receipt, the cache server to create a new connection tracking object in their respective connection arrays.

A FIN in a message indicates completion of an information transfer. Receipt of a FIN, therefore, causes a connection tracking object to be deleted after the appropriate time_wait period has expired, freeing resources for new connections.

Alternatively, the message redirector and cache server relay configuration messages for opening and closing connection tracking objects.

It should be noted that messages sent by the cache server to the redirector optionally include tags corresponding with a particular connection. A related stream of messages for servicing the information request are sent through the redirector to the requesting node on the network. Upon receipt, the redirector subsequently formats the message for transmission of the message to the requesting node on the network. For instance, if a tag is appended to the outbound message received at the redirector, the tag is deleted prior to transmission. Further, any IP and TCP source and destination information is incorporated in the message for appropriate routing.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 4A, 4B, and 4C illustrate the format of certain data structures used by the redirector.

DETAILED DESCRIPTION OF A PREFERRED EMBODIMENT

Figure 1:
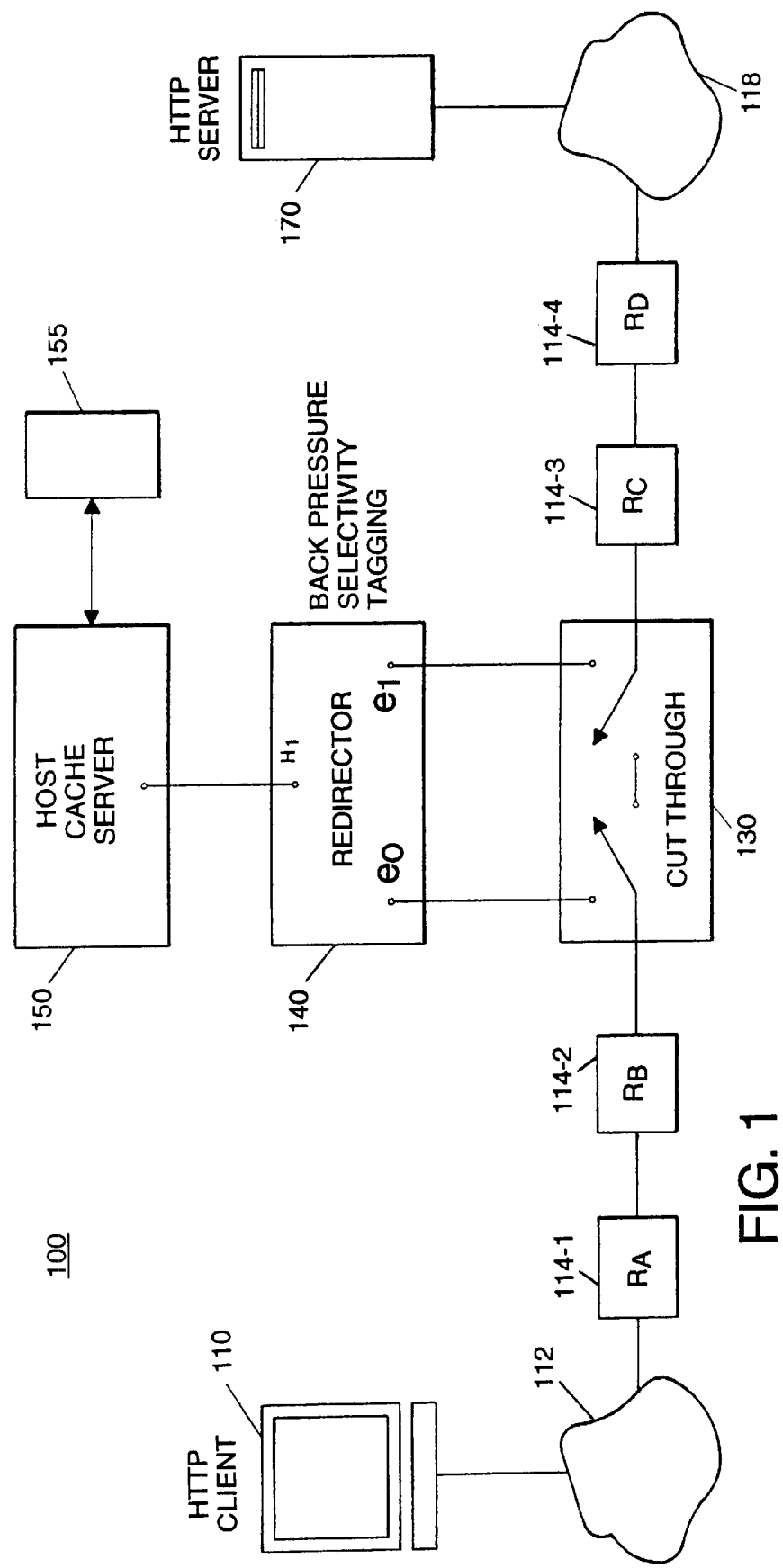
FIG. 1 is a diagram illustrating an overview of how a cache server and message redirector can be deployed in a computer network according to the invention.

FIG. 1 is a detailed block diagram of a computer network 100 and the manner in which a content server 150 may make use of a redirector 140 to achieve the advantages of the present invention. The content server, which may for example be a cache server 150, may be deployed at any of the number of places within the infrastructure of the network 100. It may be deployed at network access sites, such as points of presence (POPs), an Internet service provider (ISP), ISP peering points, interchange points in a large scale enterprise network, central offices in a local exchange carrier network, metropolitan area exchanges, or other points through which the network message traffic is concentrated.

In the illustrated embodiment, the cache server 150 is deployed at an intermediate point in the network 100. The cache server 150 is configured to cache Web pages on a local disk 155. As Web page requests travel from a hypertext transfer protocol (HTTP) client 110 through a first set of network connections 112 to a first set of connected routers 114-1 and 114-2, a redirector 140 and cache server 150 then cooperate to determine whether the Web page can be served from the local disk 155. If so, the Web pages are returned through the routers 114-1, 114-2 through the network connections 112 to the client 110. However, if the Web page requests cannot be served by the local disk 155, the original request is then forwarded on to travel through a second set of routers 114-3, 114-4 through other network connections 118, to eventually arrive at the originally requested HTTP server 170.

The message redirector 140 consists of three logical ports h0, e0, and e1. The network ports e0 and e1 each provide a physical connection to the network 100 such as to local area network (LAN) or wide area network (WAN) connections provided to the routers 114. The network ports e0 and e1 may, for example, be compliant with ethernet 10BaseT, 100BaseT, or other types of physical layer implementations, such as ATM, PPC/Sonet, frame relay, or other network protocols. Although in the illustrated embodiment the ports e0 and e1 are shown respectively connected to router 114-2 and router 114-3, it should be understood that they may provide connections to other access devices, switches, servers, bridges, and the like.

The host port h0 provides a connection for passing message traffic to and from the host cache server 150. This port h0 may also typically use more tightly coupled to connect physical layer connections such as local area network connections or may also be sharing a computer bus structure as will be described in more detail below.

The redirector 140 also contains a controller to set the position of switches in the cut through switch 130, to permit message traffic to be routed up to the cache server 150 or passed straight through the between the routers 1142 and 114-3.

The message redirector 140 is a type of message processor with certain functions that will be described in greater detail herein. In the case where the server 150 is a cache server for served cached Web content, the message redirector 140 and cache server 150 cooperate to provide a transparent HTTP object cache for the network 100. In particular, the network cache 150 monitors HTTP traffic flow between the routers 114 and stores copies of sufficiently popular Web pages. Subsequent requests for the stored Web pages, for example from the HTTP client 110, are then retrieved from the disk 155 local to the cache server 150 rather than from the network HTTP server 170. This results in a significant reduction in network line utilization and improves user response time by reducing the number of hops between the client 110 and originally requested server 170, and also by providing multiple sources for popular Web content. In addition, this advantage occurs in a transparent manner so that the cache server 150 may be introduced into the network without specific reconfiguration of the HTTP client 110 or HTTP server 170. By being designed to be a transparent device relative to Internet Protocol (IP) network state and topology, the routers 114 to the need to be reprogrammed, and either does the browser program being used by the HTTP client 110. In effect, for non-HTTP traffic, the redirector 140 behaves as a transparent Ethernet bridge.

Figure 2:
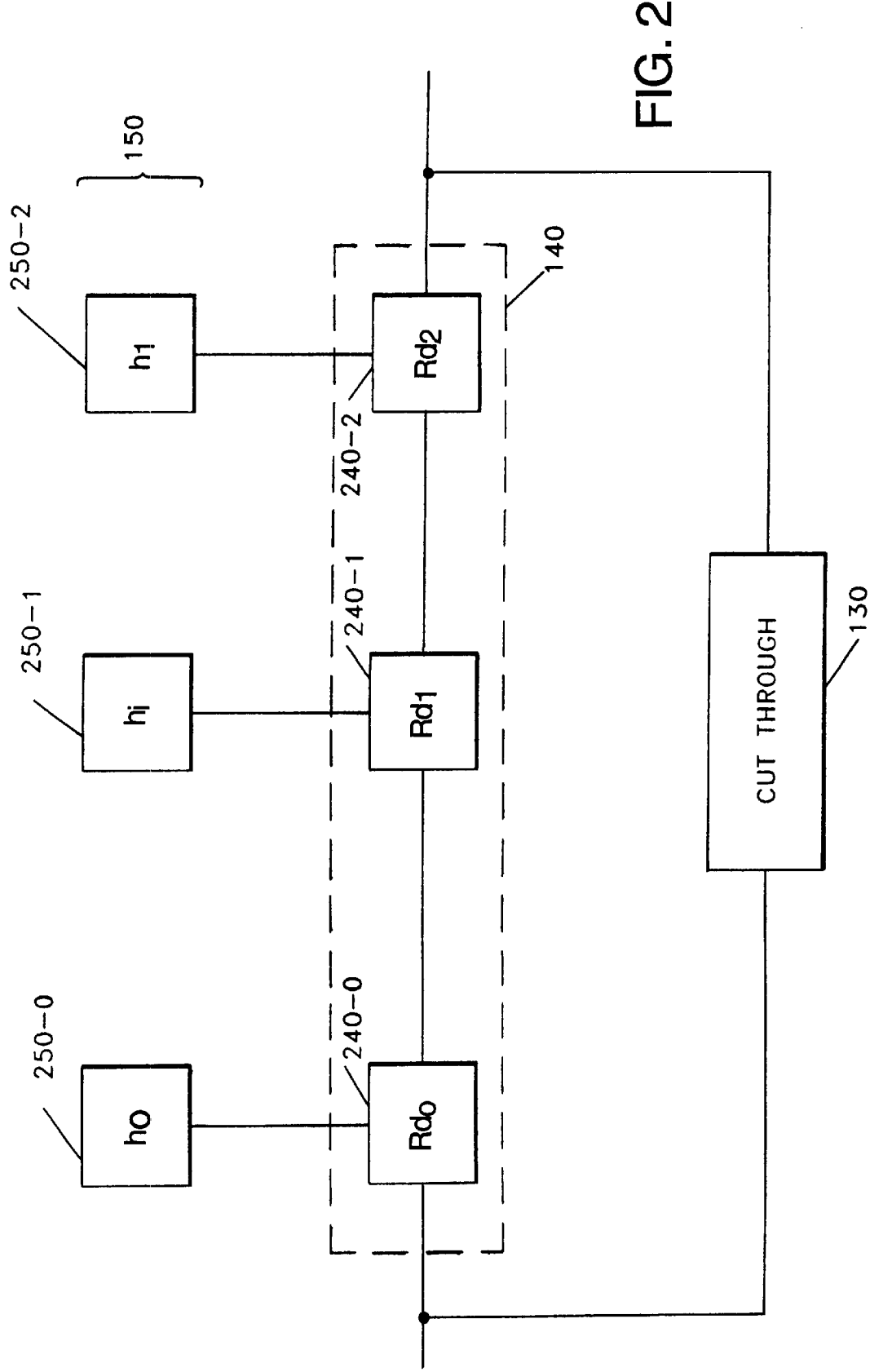
FIG. 2 is an alternate arrangement showing how multiple cache servers and message redirectors can be deployed cooperatively.

It should be understood that various arrangements of multiple redirectors 140, host cache servers 150 and the connections they make to the network 100 are possible. For example, turning attention to FIG. 2, the host cache server 150 may actually consists of a number of hosts 250-0, 250-1, . . . , 250-2 and associated storage devices cooperating to increase the performance of the overall cache server 150. In this case, the redirector 140 may physically be implemented as a number of three port devices 240-0, 240-1, . . . , 240-2 connected in series. The series connected redirectors 240 thus each provide physical access to the network 100 for each respective host 250-0, 250-1, . . . , 250-2 at a respective host port h0, h1, . . . , h2. It should be understood, however that other multi-processing arrangements are possible, such as having the redirectors 240 arranged in parallel to share a computer bus type interconnection and the like.

Returning attention now to FIG. 1, the redirector 140 performs certain critical filtering operations to optimize the routing of messages to the cache server 150. These functions present messages to the cache server 150 in a manner which optimizes its utilization.

A back pressure function provides a control over how many new connections will be attempted to be offered to the cache server 150 depending upon its reported load.

The selectivity function provides most of the rest of logic necessary for transparency. Its primary function is to bridge packets that the host server 150 is not processing straight from port e0 out through to port e1. Packets that are being processed by the cache server 150 are passed up the stack through the one or more host ports h0, h1, . . . , h2. The selectivity feature is in effect used to attempt to "hijack" only those packets which have a high probability of being related to HTTP objects or documents connections which the cache server 150 has already stored or, in the case of a new connection request, is capable of servicing.

Figure 3:
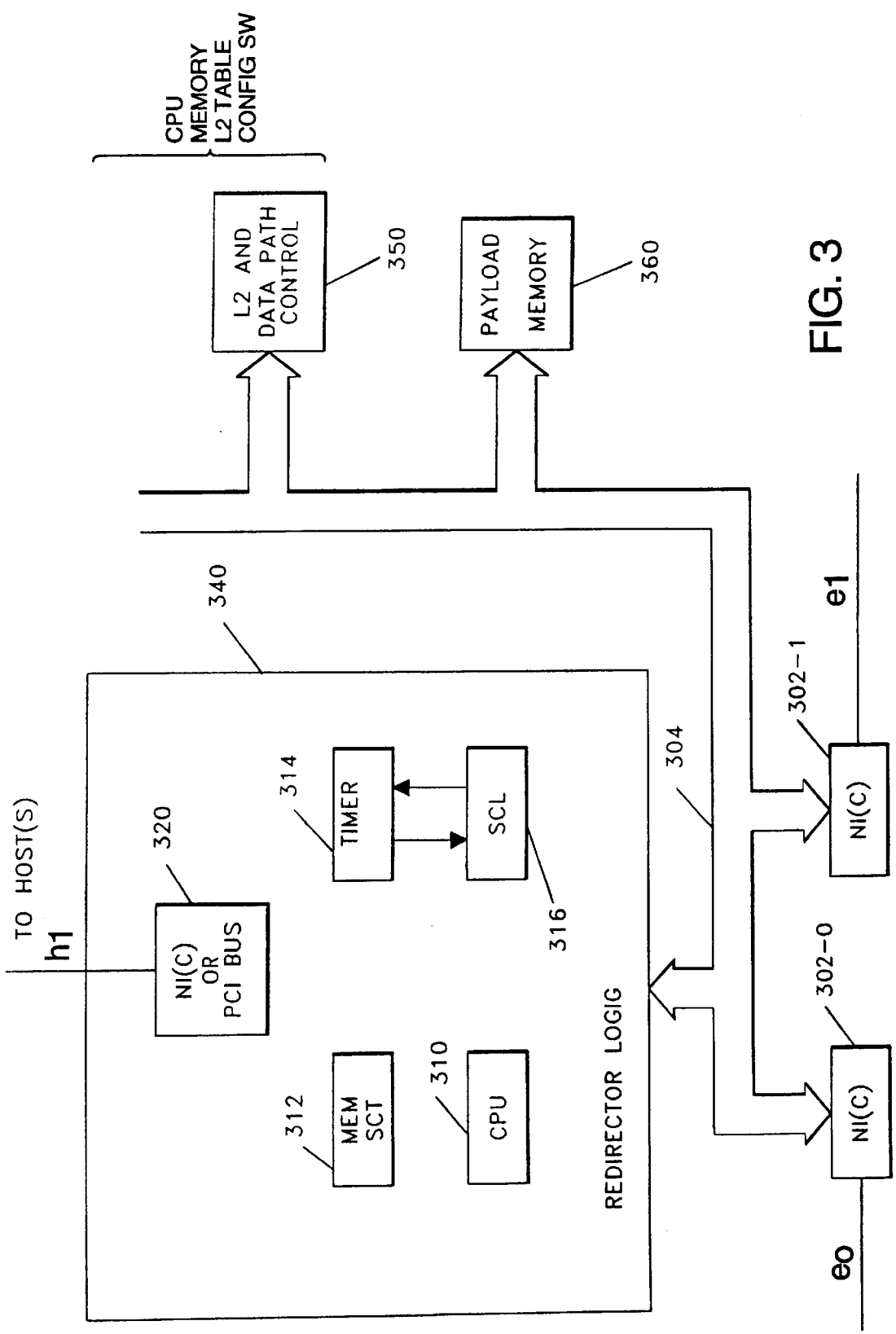
FIG. 3 is a more detailed view of the transparent message redirector.

A hardware block diagram of a message redirector 140 which implements these features is shown in FIG. 3. It consists of a pair of network interfaces (NI) 302 which may be integrated circuit chips or cards (NI(C))s) 302-1, 302-2, each associated with particular router connection, respectively, e0 or e1. The NICs 302 forward packets to an internal bus structure 304 through one or more circuit interfaces such as PC industry standard architecture (ISA), extended ISA (EISA), or PCI bus interfaces. A redirector controller 340, layer two (L2) data path controller 350, and payload memory 360 are also connected to the internal bus structure 302.

The redirector controller function 340 includes a central processing unit (CPU) 310, an associated memory 312, timer 314, and a selective connection logic 316. The L2 and data path control circuitry 350 is used to control how packets are routed to and from the various elements of the redirector 140. It comprises circuits that control the state of the internal bus 304, to allow packets to be moved from the e0 port through to the e1 port, or from one of the e0 or e1 ports up to the redirector logic 340 and/or packet payload memory 350. In a multiport implementation where there are more than one host port present, the redirector logic 340 may be replicated for each host port h0, h1, . . . , h2, or the redirector logic 340 may control more than one host port.

The payload memory 350 is used as a temporary buffer to store the payload portions of a packet while the rest of the redirector logic 340 is determining where to route the packets.

Where small physical size is desirable, the internal bus 304 may be an industry standard PCI bus and the NI(C)s 302 may be integrated circuit chips. This configuration may be the least expensive for volume manufacturing in the case of a single host port implementation. In other implementations, the NI(C)s 302 may be individual circuit cards, and the bus 304 an external bus. This "external box" configuration may be more desirable for servicing multiple hosts 150.

FIGS. 4A, 4B, and 4C are more detailed views of various data structures used in the redirector 140. FIG. 4A is a layer two (L2) routing table 410. The L2 routing table 410 permits the redirector 140 to perform certain standard learning bridge functions. It therefore contains fields related to known L2 addresses in the system 100, including a Media Access Layer (MAC) layer address field 411. The L2 routing table is typically implemented using known fast lookup techniques such as hashing functions. The table 410 also contains information specific to the redirector 140, such as a port field 412, a static/dynamic state field 413, and age field 414. The purpose of each of these fields will be described in greater detail in connection with FIGS. 5 and 6. It is sufficient here to note that the port field 412 is a decoded bit field indicating to which port (e0, e1, or h0) a packet having the associated MAC layer address should be routed, the static/dynamic state field 412 indicates where layer 3 (L3) filters should be bypassed, and the age field indicates how long the entry has been in the table 410.

FIG. 4B illustrates a connection tracking object table 420 which will be described in greater detail in connection with FIGS. 7 through 11. It includes entries associated with active connections that the cache server 150 is presently servicing, including an Internet Protocol source (IPs) address field 421, an IP destination (IPd) field 422, a TCP source (Ts) field 423, and TCP destination (Td) field 424. A port number field 420 indicates information relating to how to route packets internal to the cache server 150.

Finally, FIG. 4C illustrates a selective address table 430. As will be understood shortly, this table is used to determine whether or not a packet is actually routed up to the cache server 150 based upon a number of conditions. The entries in this table 430 include at least an IP address field 431 and a mask 432. An optional rating field 433 may be used to support a feature known as weighted selectivity; a port number field 434 is used in implementations supporting more than one host port h0, h1, . . . , h2.

Figure 5:
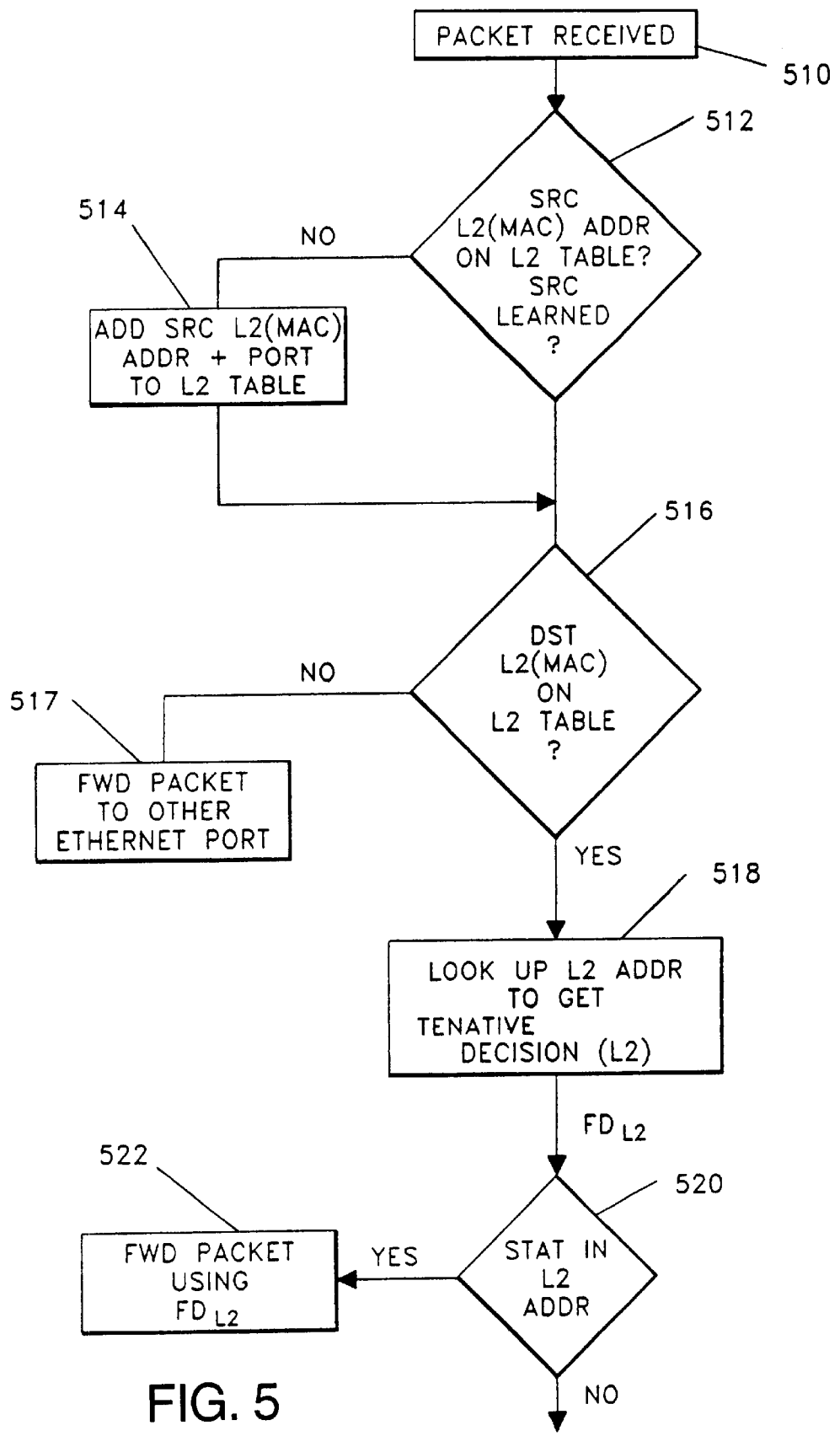
FIG. 5 is a flow chart of the steps performed by the message redirector to support layer two (L2) bridge functionality.

FIG. 5 is a more detailed flow chart of certain operations performed by the redirector logic 340 to perform the selectivity and connection tagging functions.

In an initial state 510, a packet is first received. Moving next to state 512, the source address of the packet is examined.

If the layer two (L2) (MAC) address is present on the L2 table 410, then processing can proceed to the next state 516. If however the L2 address is not on the L2 table 410, then this address has not yet been learned by the redirector 140. In this instance, a state 514 is first entered in which the source address and port number are added to the L2 table 410, to implement learning bridge functionality.

Continuing in state 516, it is then determined if the destination L2 address is located on the L2 table. When the L2 address is not present, the redirector 140 simply passes the packet to the opposing ethernet port (L2 broadcast) in state 517.

State 518 is next entered in which the L2 destination address is used to determine a tentative L2 forwarding decision. This decision, referred to herein as the $FD_{L2}$ decision, is indicated by reading at least the port number field 412 by finding the associated destination address in the MAC address field 411. Whichever bits are set in this field indicate to the redirector logic 140 to which port, e.g., e0, e1, or h0 (or h1, . . . , h2 if present) the packet might be routed to, e.g., tentative routing decision.

In state 520, if the static/dynamic bit is set to indicate a static address, then this indicates a type of packet which is intended not for network connected devices 110 or 170, but rather a "forus" management layer packet intended for the cache server host 150 itself. This bit may also be set in the case of a MAC layer broadcast address, as show in FIG. 4A.

In this instance, state 522 is entered in which the packet is forwarded using the $FD_{L2}$ decision.

Figure 6:
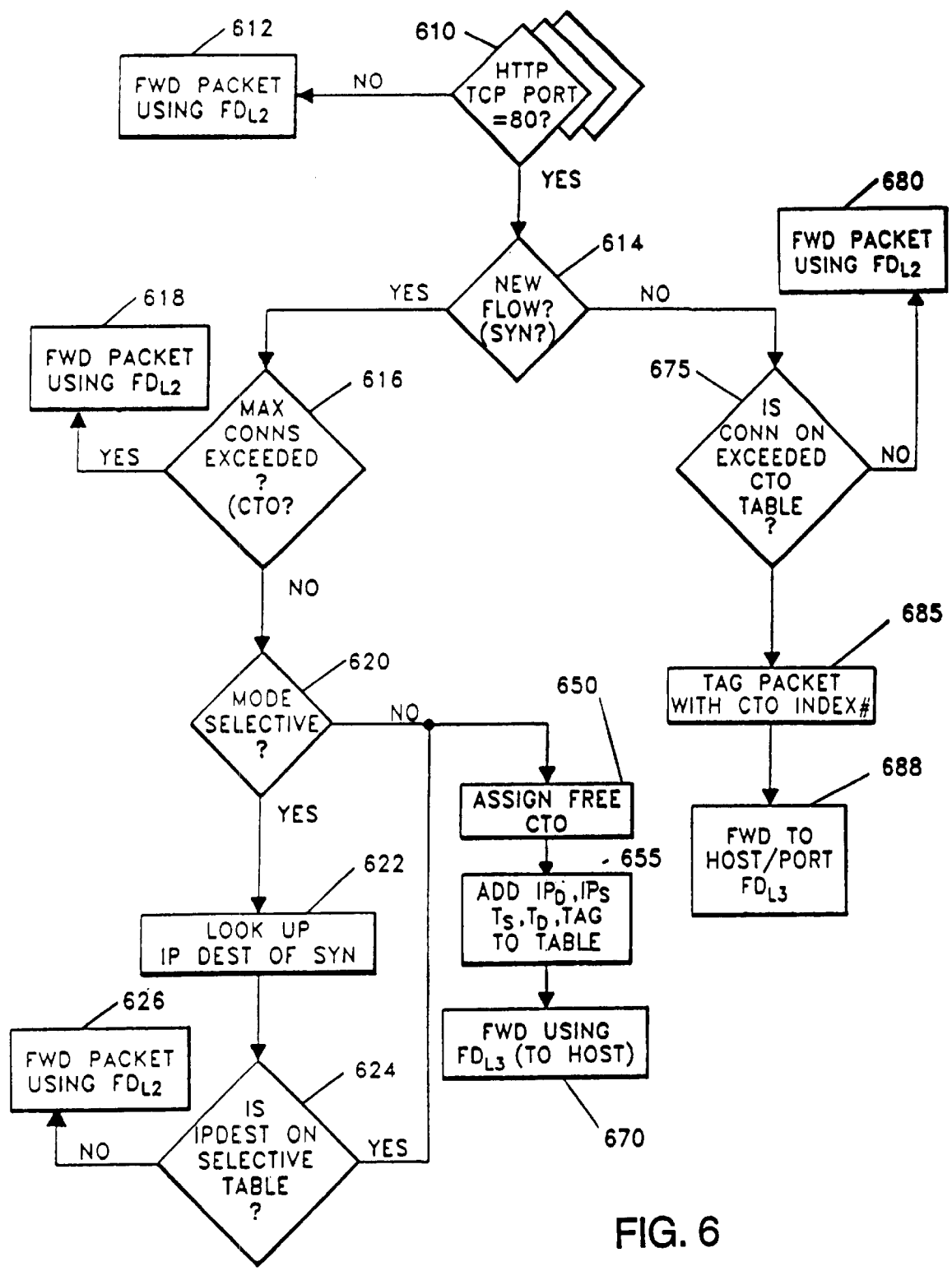
FIG. 6 is a flow chart illustrating how selectivity and connection tagging/tracking is implemented in the filter logic.

Otherwise, processing continues with a state 610 as indicated in FIG. 6. In this state, an initial packet filtering function is performed such as by packet type. In the case of a cache server 150 serving Web pages, the TCP header port number is read in state 610 to determine if it is an HTTP packet. It should be understood that other types of packet filtering may be performed at this juncture.

In the case of an HTTP packet filter, if the packet received is not an HTTP packet, such as if the TCP header port number is not set equal to "80", then the packet is simply forwarded, or bridged, in state 612 using the $FD_{L2}$ decision.

Thus, for example, if the packet was received in on interface e0 from router 114-1, it is forwarded directly out in the direction of router 114-4 on port e1. Similarly, if the packet was received from router 114-3 on interface e1, it is routed straight out through interface e0 towards router 114-2.

If, however, the packet is an HTTP packet, then processing proceeds to a state 614. One consideration at this point relating to HTTP selectivity is IP fragmentation, which occurs because HTTP packets are sometimes fragmented into multiple IP packets. In such an instance, they will at this point need to be reassembled before they can be passed up the stack (assuming, for example, that the TCP header is present only in the first packet).

In any event, in state 614, the packet is examined to determine if it indicates a new connection (or "flow") such as if it includes an SYN packet. Such SYN packets indicate the beginning of a request for a connection for an HTTP object.

If the packet is not a SYN packet, then this packet relates to a connection which has already been set up. Processing proceeds to state 650 in which other attributes of the connection are examined to determine if and how the packet is to be handled.

If the packet is an SYN packet, then a new TCP connection is being requested. In state 616 and the following states, a selective connectivity feature determines whether or not a new connection should actually be established with the cache server 150.

State 616 specifically determines if a maximum number of connections are already being serviced by the cache server 150. If this is the case, then processing proceeds to state 618 where the packet is simply bridged out of the redirector using the $FDL_2$ tentative decision.

If the cache server 150 is still accepting new connections, then processing proceed to the selective connection state 620, where it is determined if the redirector is in a "selective" or "non-selective" mode.

The connection selectivity function is a feature which attempts to maintain a list of the IP addresses of the servers 170 that contain the most popular objects stored in the cache server 150. A selective connection table (SCT) generation process, executing as part of the cache server, is responsible for generating information to permit the redirector 140 to maintain the list referred to the selectivity connection table (SCT) 430. This selective connection table 430 allows the message redirector 140 to hunt for connection requests (SYNs) that have a higher probability of a hit in the cache server 150, given that their destination IP address already has content loaded in the cache server 150. This selectivity feature also allows the cache server 150 to effectively shift the optimum cache locality point because it allows the cache server 150 to effectively participate in the need to compare fewer IP addresses.

Sub-net masks 432 and/or complete IP addresses may be used as the addresses stored in the selective connection table 430. For example, certain popular Web sites, such as cnn.com or yahoo.com, typically have a number of pages associated with them that may rise to the level of being sufficient popular to be maintained in the cache 150. In this instance, rather than maintain the complete four-digit full IP address for each page, a sub-net information mask 432 may be provided to indicate more than one page from the site is stored in the cache.

In the preferred embodiment, a selectivity policy can be implemented through an initial time-based test to implement a selectivity period. The selectivity period is determined by a single timer circuit 314 that is global to all selective connections. Briefly, if a select connection (an SYN with an IP address in the selective connection table 340) is not found before the timer expires, the selective connection state switches to a non-selective mode. In this non-selective mode, any occurring SYN will be permitted to be routed up to the cache.

Thus, in the selective mode, only SYN requests which already have their associated IP addresses and/or sub-net masks stored in the selective connection table 430 are permitted to be routed out to the cache server. In the on-selective mode, the next SYN will be routed up. In this mode, the system provides an N/K selective to non-selective behavior.

As shown in FIG. 6, the connection selectivity function can be provided from state 620 as follows. In state 620, the contents of the timer 314 is detected and used to determine if the selective mode should be entered. If the timer indicates that it is not time to enter the selective mode, then processing can exit from state 616 to prepare the new connection by tagging it in state 660.

If, however, in state 620 the timer indicates the selective mode is active, then the state 622 is entered to look up the IP address of the SYN request. In state 624, if this address is located in the selective connection table 430, then the new connection will not be permitted to be maintained. In this instance, the packet is forwarded out of the redirector 140 using the tentative L2 decision $FD_{L2}$ in state 626. The connection therefore will not be serviced locally.

However, if the destination address is on the selective table 430, then processing will continue with state 650.

If redirector is not in selective mode in state 620 or if IP destination is on the selective address table, then a connection tracking object and associated tag is assigned in state 650.

Assigning a connection tracking object for each active connection between the cache server 150 and a client on the network serves to off-load data processing at the redirector 140. For example, when a connection is to be maintained between the cache server 150 and client 110, multiple messages are typically exchanged between the client 110 and cache server 150. Since the redirector 140 and cache server 150 service multiple connections or communication sessions simultaneously, inbound messages from multiple clients 110, therefore, must be analyzed to determine to which connection a corresponding message should be directed.

Rather than analyze a newly received message at the cache server 150, the process of analyzing the source and destination information of received data messages is done at the redirector 140. After determining the connection associated with a message received at the redirector 140, a corresponding tag for that connection is appended to or incorporated into the message. As mentioned, this shifts the burden of processing inbound messages from the cache server 150 on to the redirector 140.

Figure 11:
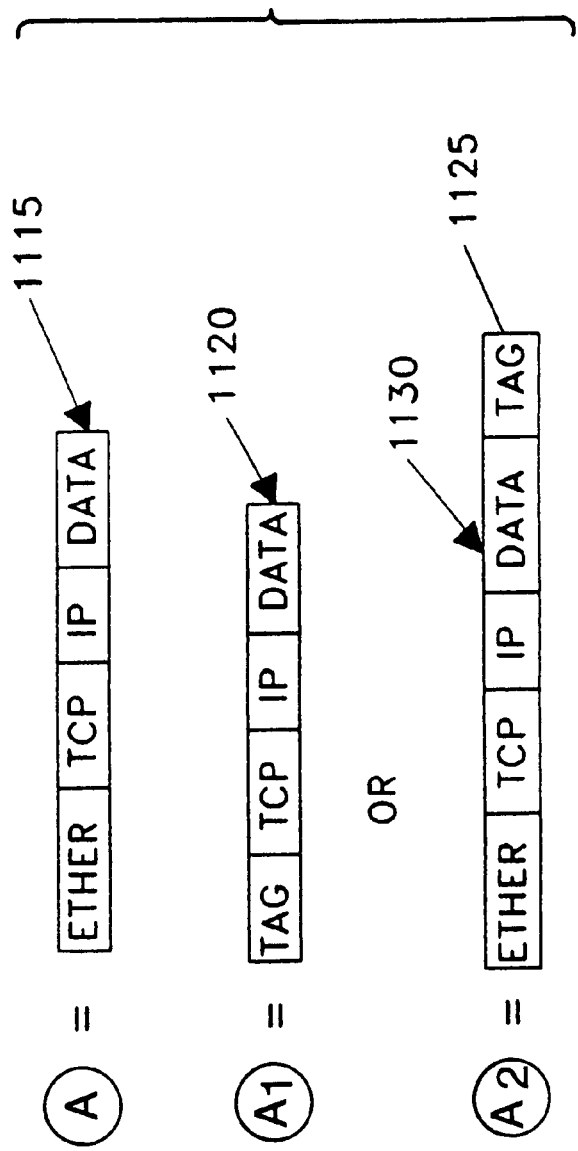
FIG. 11 is a diagram illustrating how tags are appended or inserted into a network message.

FIG. 11 is a diagram illustrating how a tag 1125 is either appended to an original message 1115, thus, forming a tagged message 1130. Alternatively, a tag is optionally overwritten in an Ether field of the original message 1115 to create an embedded tag within the tagged message 1120.

This process of assigning an index tag to a connection and appending the corresponding index tag number simplifies bit manipulation at the cache server 150 because the cache server 150 receiving a tagged message from the redirector 140 needs only to read the tag to determine the associated connection to which the message pertains. Otherwise, many bits of information such as the IP source and destination and TCP source and destination address of the received message would have to be analyzed at the cache server 150 to determine the corresponding connection.

Figure 10:
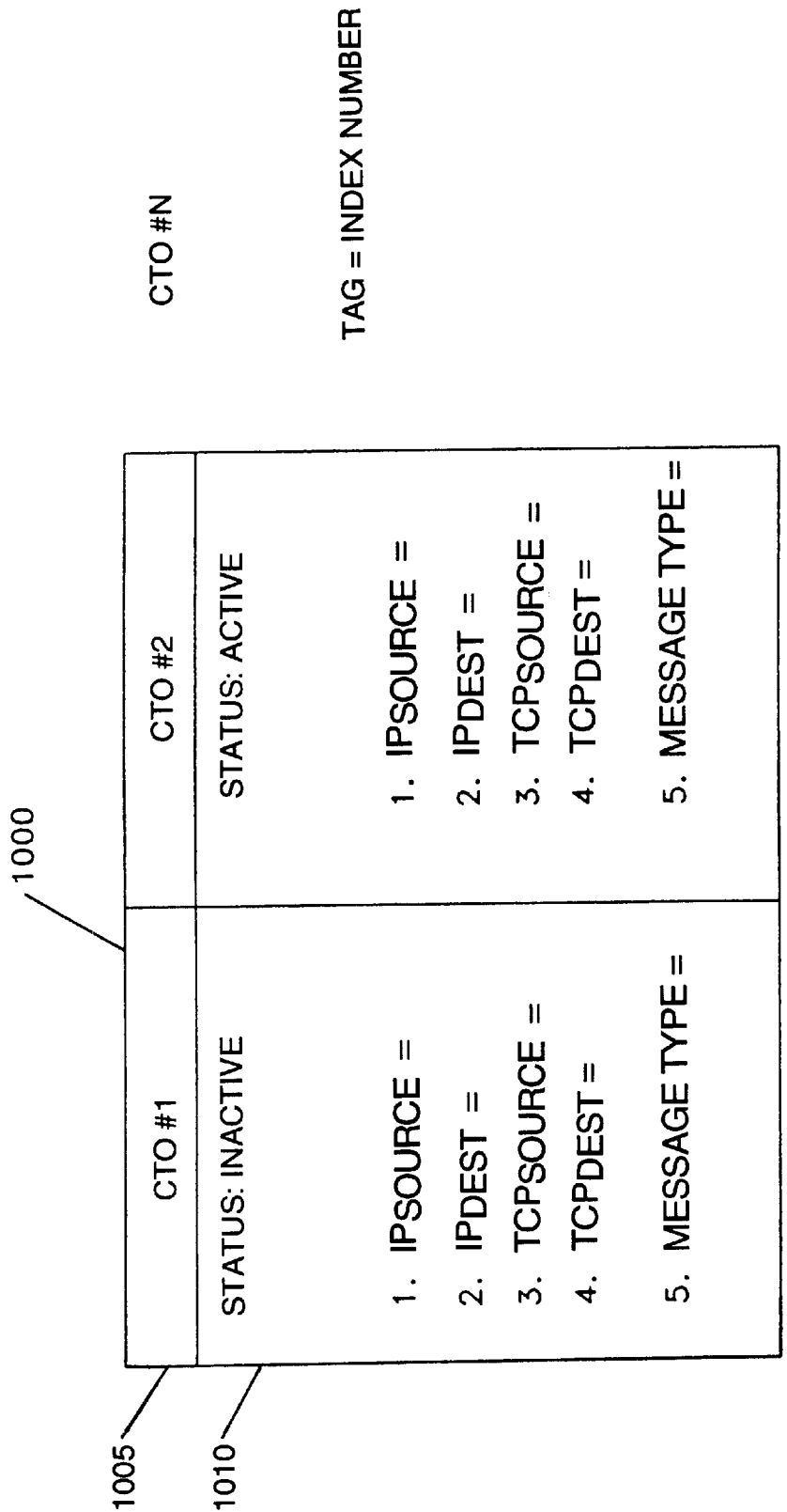
FIG. 10 is a table of connection tagging objects.

FIG. 10 is an array of N connection tracking objects 1000 for maintaining information associated with a particular connection. During operation, a similar array of connection tracking objects 1000 is maintained by both the cache server 150 and redirector 140. Accordingly, this provides the redirector 140 and cache server 140 a shorthand way of communicating which connection a message pertains. For example, the easy-to-read tag of a message passed between redirector 140 and cache server 150 indicates the connection to which the message pertains.

Each tag number is an index number corresponding to the connection entry in the connection tracking object array 1000. For example, connection tag #1 is an index pointer for the first object entry in connection tracking object table 1000, connection tag #2 is an index pointer for the second object entry in connection tracking object table 1000, and so on for each of an array of N connection tag objects 1005.

Referring again to state 650 in FIG. 6, a connection and corresponding connection tag object 1005 must be established for the newly received data message and related subsequent messages. This process involves assigning a free connection tracking object 1005 in the connection tracking object table 1000 for the new connection.

After a connection tracking object 1005 is assigned for a new connection, the information associated with the connection is stored in the new connection tracking object 1005 in state 655. For example, the IP and TCP source and destination address of the connection are stored in the connection tracking object 1005 so that the TCP and IP source and destination addresses of other received messages can be compared to those in the connection array 1000 to determine whether the message pertains to an active connection.

Additionally a status 1010 of the connection tracking object is maintained, signaling whether a connection is active or inactive. In the present case, the status 1010 of the newly created connection tracking object 1005 would be set active. Further, a message type, i.e., UDP, TCP . . . , is stored for the connection. Finally, a port number stored in the connection tracking object 1005 identifies which cache server 150 a connection pertains in the event that the system includes multiple cache servers 22.

Following the storage of appropriate connection data for the connection tracking object 1005 in state 655, the corresponding index is appended or incorporated in the network message. In the preferred embodiment, the tag is stored in the Ethernet field or link layer. Thereafter, in state 670, the newly tagged message is forwarded to cache server 150 and is processed based on network layer 3 information.

It is common for failures to occur in any networking system. Therefore, active connections are monitored for activity or communication between the cache server 150 and clients 110. If the communication on a given connection is inactive for a predetermined time, the connection tracking object at both the redirector 140 and the cache server 150 are closed, i.e. set inactive, freeing resources for new connections. This grace time can depend on the availability of resources and present traffic through the redirector 140. For instance, when the redirector 140 is plagued with traffic and there are no resources to open new connections, the grace time for a presumed failed connection may be shorter since the resources are optimally used to service other requests.

If the message received by the redirector 140 in state 614 is not a new message pertaining to a new flow, i.e., it does not include a SYN message, then it is thereafter determined if the message pertains to a an active connection tracking object 1010 in state 675. This involves comparing the TCP and IP source and destination address of the received message with active connection tracking objects 1010 in the connection array 1000. If a match is found indicating that the message relates to a particular connection in state 675, the redirector 140 marks the message with the corresponding tag index number in state 685. The tagged message is then forwarded to the cache server 150 in state 688 based on layer 3 redirect routing.

Alternatively, if there is no corresponding connection open for a particular message in state 675, the message is forwarded to the cache server 150 based on layer 2 routing in state 680.

Figure 7:
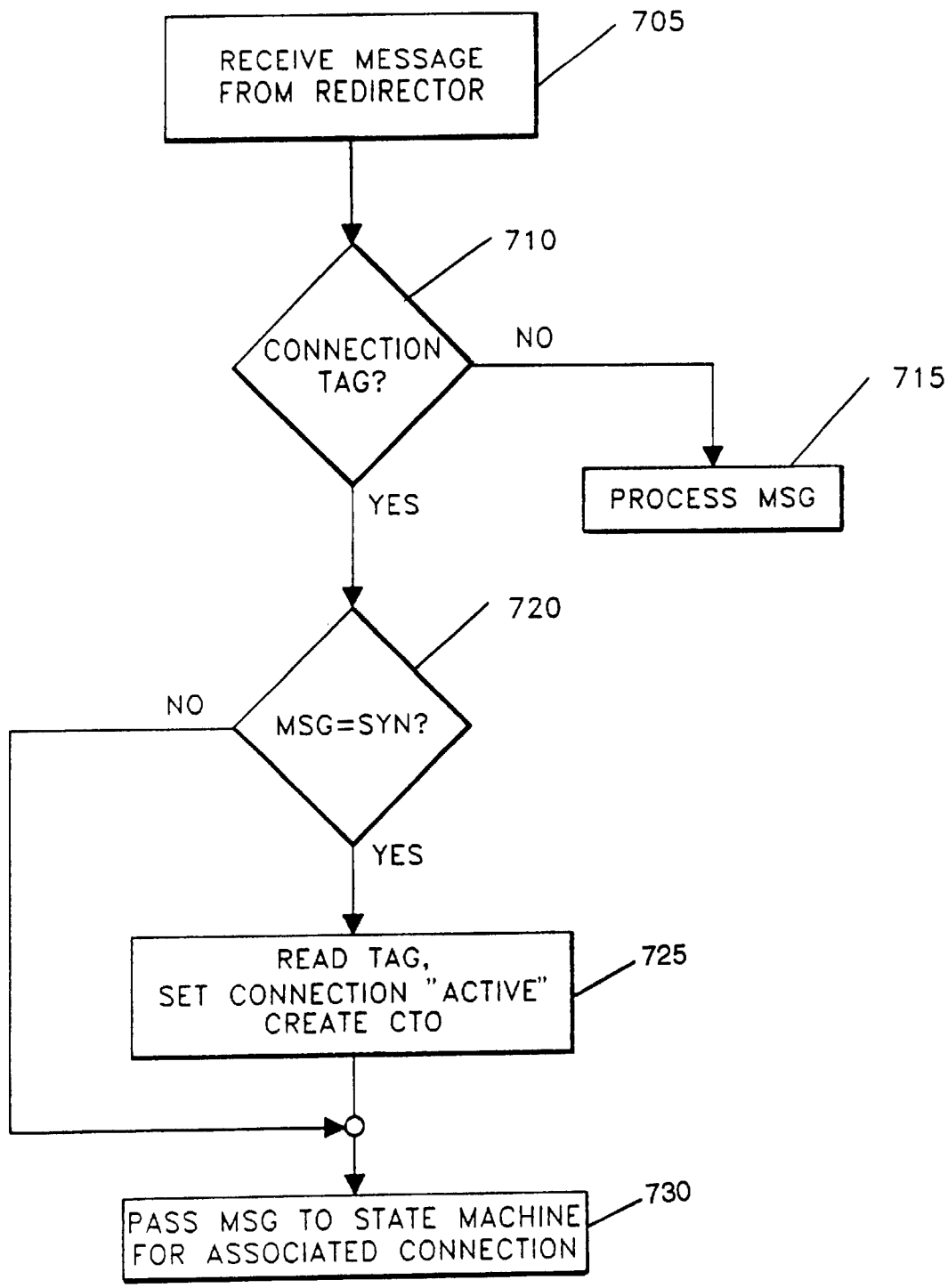
FIG. 7 is a flow chart for processing received messages in the filter logic.

FIG. 7 is a flow chart illustrating how messages received from the redirector 140 are processed at the cache server 150. The process involves first receiving a message from the redirector 140 in state 705. If the received message in state 710 does not include a connection tag, the message is sent to the appropriate socket using standard Unix TCP/IP routing in state 715.

If there is a connection tag associated with the received message in state 710, the message is passed on to state 720 to determine whether the message includes a SYN message. If not, the tagged message is directed within the cache server 150 to the connection running on the TCP state machine corresponding with the tag in state 730. Again, the tag number is an index number to the proper TCP state machine or session connection corresponding with the tagged message.

If the message received from the redirector 140 includes an SYN message and a tag in state 720, this indicates that a new connection is to be opened for the requested object. The corresponding tag is the index number of the connection in the connection tracking object array 1000 to be established for future communication of a particular connection. A connection tracking object 1005 is created including the information as described in FIG. 10.

Both the message redirector 140 and cache server 150 both track a particular connection based upon the content, at least in part, of each message. As a result, both the array in the redirector 140 and cache server 150 mirror each other, i.e. both arrays include substantially identical information, supporting the harmonious processing of messages. After it is determined to which connection the message pertains, the message is then processed in state 730 on the appropriate TCP state machine in the cache server 150.

Figure 8:
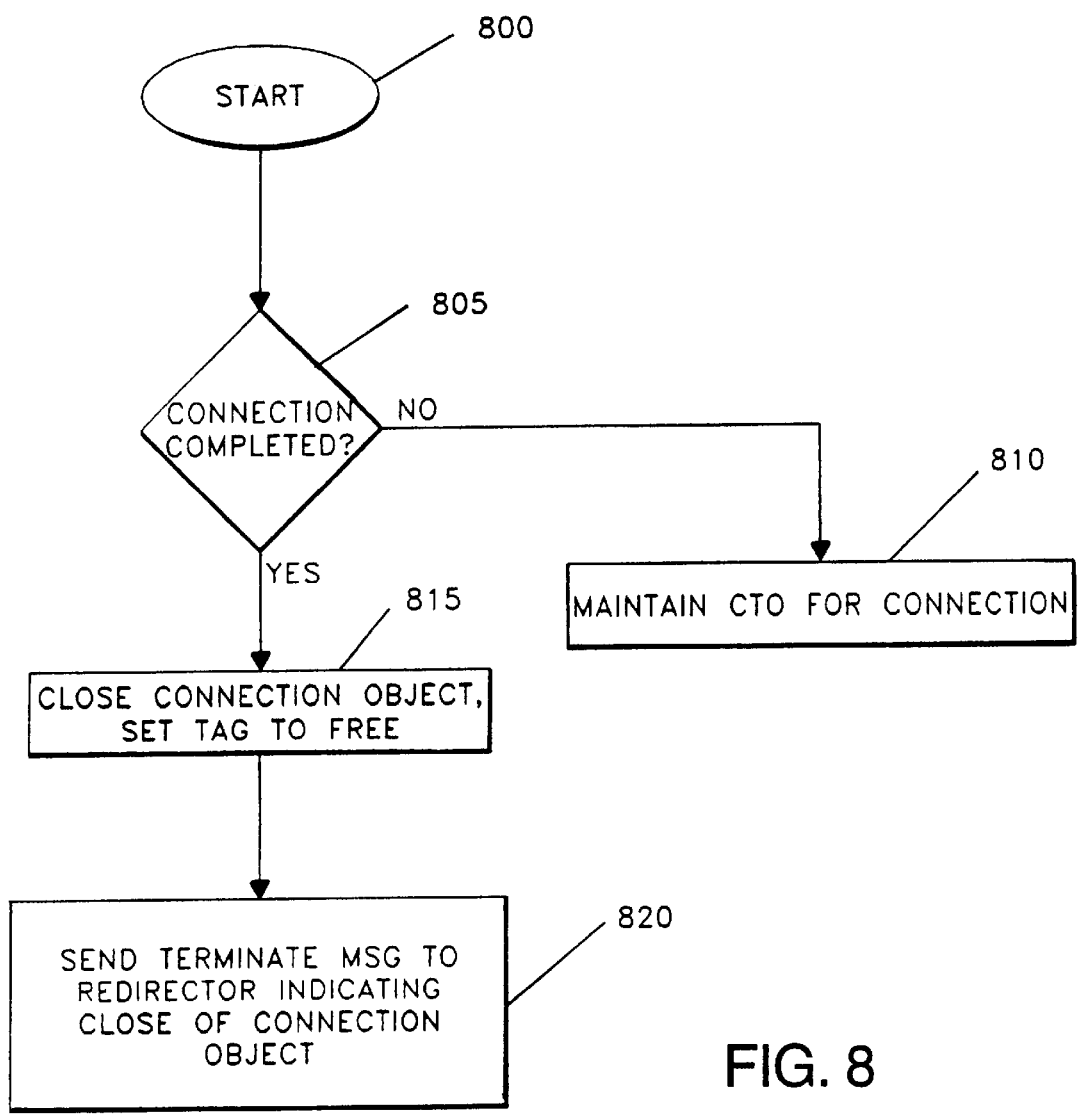
FIG. 8 is a flow chart for closing a connection in the cache server.

FIG. 8 is a flow chart illustrating the process associated with closing or maintaining a connection in the cache server 150. First, the cache server 150 determines in state 805 if an object request by a node is properly serviced and the associated connection should be freed. If communication for a particular connection is not completed in state 805, the connection is maintained for further communications between the requesting node such as client 110 and cache server 150 in state 810.

If it is determined that a connection shall be closed in state 805, the connection is closed in state 815 where the status 1010 of the connection tracking object 1005 is set inactive to indicate that the connection tracking object 1005 and corresponding tag are free for a new connection. In the preferred embodiment, a message associated with closing the connection tracking object 1005 is sent to the redirector 140 in state 820 so that the corresponding object in the redirector's 140 connection tracking object array 1000 is also closed.

However, it should be noted that the cache server 150 and redirector 140 also maintain substantially identical connection tracking object arrays 1000 by each decoding the contents of the message to determine whether to open a new connection. For example, a connection and corresponding connection tracking object 1005 at the redirector 140 can be closed based on the detection of a FIN message, indicating that the message is last in line of a related stream of messages.

Figure 9:
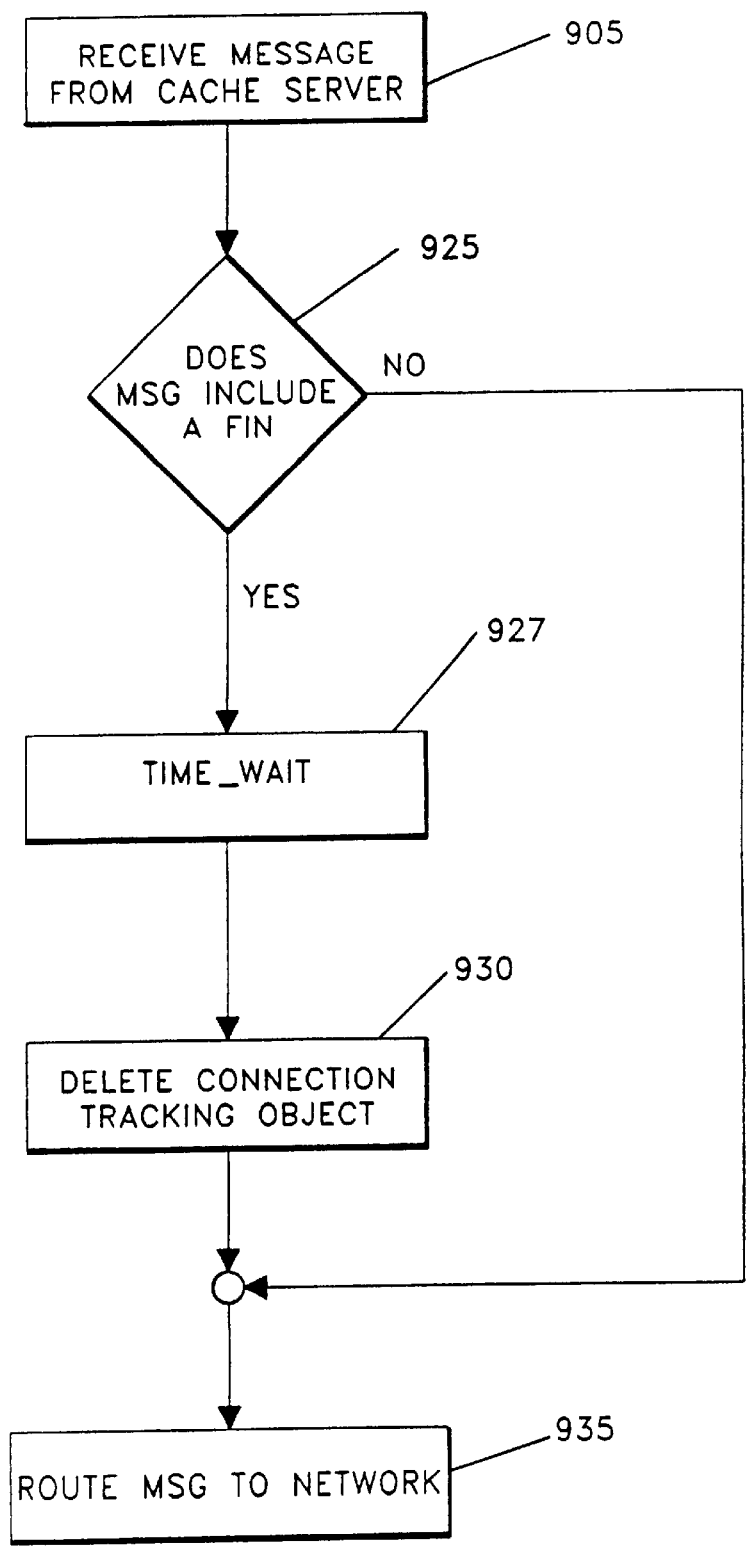
FIG. 9 is a flow chart for closing a connection in the redirector.

FIG. 9 is a flow chart illustrating how messages received from the cache server 150 are processed by the redirector 140. Messages are first received from the cache server 150 in state 905. It is then determined whether the message includes a FIN in state 925. If not, the message is routed to the network in state 935. If the message includes a FIN message in state 925, a "time wait" function is performed in state 927. Following time wait, the connection tracking object 1005 associated with the message is deleted in state 930 because the FIN message indicates the last of the data messages sent between a requesting node such as a client 110 and the cache server 150 for a particular connection. Based on this method of closing a connection in the redirector 20 and cache server 150, the associated connection tracking object arrays 1000 appropriately mirror each other.

Alternatively, a connection tracking object is closed based upon a direct order from the cache server 150. For example, if a connection tagging object is to be closed, the cache server optionally transmits a message to the redirector 140 to close a particular connection tracking object 1005.

Messages transmitted over the network in state 535 are "unmarked" with the tag before they are sent out over the network. For example, the tag is a code understood only by messages being passed between the cache server 150 and redirector 140. Hence, prior to transmission of the message over the network, the appropriate information from the connection tracking object is incorporated back into the message for proper routing if it is not already there. For example, the appropriate IP and TCP source and destination address are incorporated in the message. If a connection tag was appended to the network message, it is deleted so as not to interfere with subsequent routing of the message on the network.

As briefly described above, the implementation of a selective connectivity period provides a natural effect of controlling the new connection acceptance rate. For example, consider the case where the cache 150 is hunting for selective connections but the population of selective connections is low. In this case, the new connection SYNs allowed to be routed up to the cache server 150 are spaced at intervals of the selectivity period, t, plus the average SYN arrival interval.

Another important feature of the selectivity time period is that it provides a natural load control mechanism. For example, assume that the number of offered connections, $(O_c)$, is the actual number of connections passing through network 100. Also assume that the number of serviceable connections $(S_c)$ is the number of connections that the cache server 150 can actually service at any point in time. In general, the number of offered connections $(O_c)$ will exceed the number of serviceable connections $(S_c)$ since the cache server 150 has a finite capacity.

The goal is to obtain a higher hit rate for the cache server 150 as measured in the number of objects delivered from the cache server 150 as opposed to the number of objects which must be obtained from routes from the HTTP servers 19. Assuming that the number of offered connections exceeds the number of serviceable connections, setting the selectivity period to zero causes the cache server 150 will attempt to service all of the offered connections.

On the other hand, if the selective connection period is set to a relatively high value, such as 100 milliseconds, the cache server 150 will likely service a connection count which is under its maximum capacity and thus spend most of its time hunting for SYNs that are on its selectivity list. Thus, by adjusting the selectivity period setting, one can provide an optimum connection load for the cache server 150.

To achieve this, the server 150 may preferably use a successive approximation approach by first setting the selectivity period to a predetermined value, such as fifty percent of a known maximum value, and then moving it up and down until the connection load runs just slightly below the maximum period. When this point is reached, the selectivity period is increased just enough to allow the server to run at an optimum rate.

Figure 12:
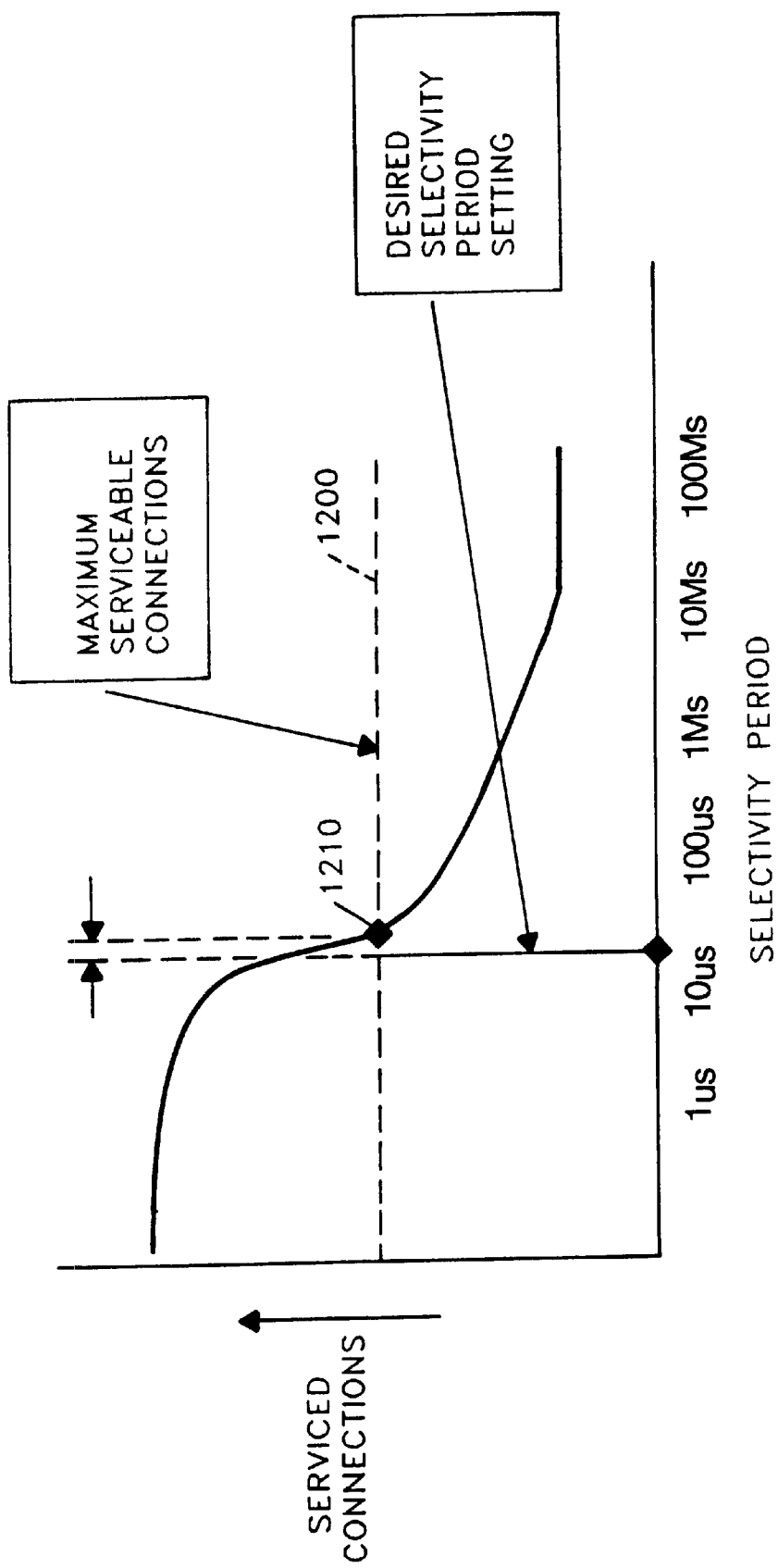
FIG. 12 is a plot of an exemplary optimum selectivity period versus number of offered connections.

Turning attention to FIG. 12, there is shown an example of a plot of the number of serviced connections as a function of selectivity period. A horizontal dotted line 1200 indicates the maximum number of serviceable connections. By starting out a relatively high value, such as 100 milliseconds, for the selectivity period, the number of serviced connections is relatively low. However, as the selectivity period is reduced, the number of serviced connections gradually increases until a point is reached, such as at 1210, in which the maximum serviceable connections are reached. It is this setting or setting slightly below this which is the desired setting for the selectivity period. This will ensure that the cache server 150 is still attempting a sufficient number of new requests without becoming overloaded. This maximizes the hit rate in the cache. A natural time delay spacing for new connection requests is thus provided by setting the selectivity period to a value that slightly exceeds the system's maximum selectivity connection capacity.

However, it is also desirable to vary connection selectivity as a function of the load. In other words, it may be desirable to vary the selectivity period as the load increases or decreases. There are many advantages to this approach including:

(a) it is better to set the selectivity period to zero if the offered load fails to stress the server. This maximizes the cache utilization under light loads.

(b) for the moderate load case, it is desirable to set the Selectivity period at a lower period than the heavily loaded case. Again, the heavy load period may not be the optimum setting at moderate loads.

(c) varying the selectivity period as a function of system state is also desirable. For example, if a system has been recently "cleared" and is re-converging (loading new objects into cache) it is likely that the optimum selectivity setting will be less.

The conclusion that can be drawn is that the selectivity period is likely to be a non-linear value that will vary as a function of load. Moreover, this non-linear function will likely vary as a function of time. The first version of selectivity is likely to use the number of active or more desirable—offered connections to detect load. Thus, a typical function is suggested in FIG. 13.

Figure 13:
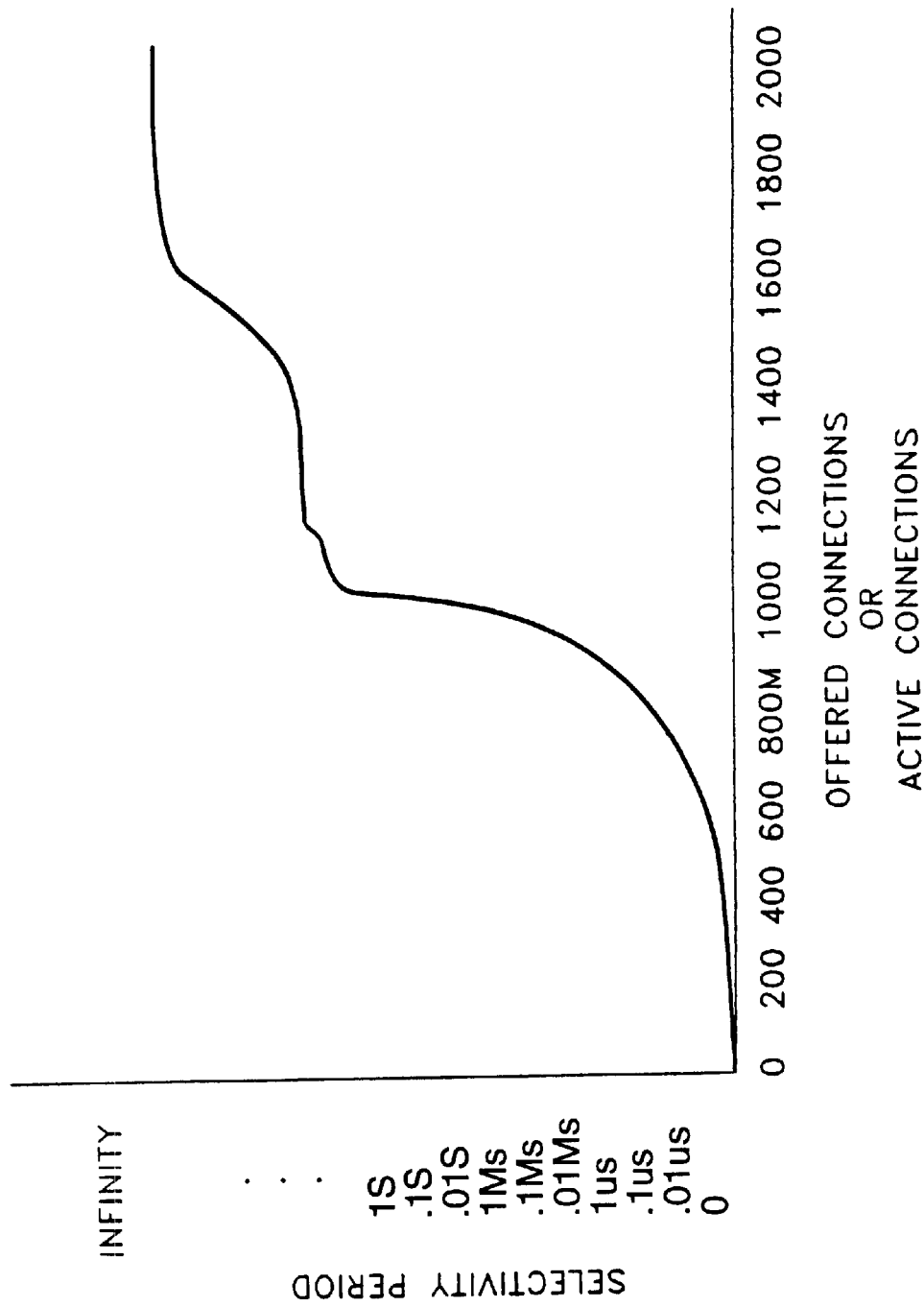
FIG. 13 is an exemplary selectivity function.

It is expected that selectivity period setting as detected by the counter would therefore not be a constant but rather be a variable stored in a hardware memory that is loaded by either the server 150 or an intelligent subsystem, such as the NI(C)s 302. When a NIC 302 begins a new connection hunt phase, it uses the current connection count as an index into the selectivity array and reads out a period setting to use. In the above illustration suggests a possible non-linear selectivity array and reads out a period setting to use. In the example of FIG. 13, we assume that the server 150 runs efficiently at a maximum load of 100 to 1400 connections as the load approaches maximum, the server 150 becomes increasingly selective by increasing the selectivity period. The selectivity period can actually reach infinity, meaning that the only requests to be processed are connections that have entries on the selectivity table 60.

To understand how various systems may require different optimized parameters, assume that the function, F1, shown in FIG. 13 represents one of many possible functions that can be loaded into the selectivity function table. Moreover, assume that the server has numerous functions that are loaded based on the system's "state." Examples of system state include the number of objects that are stored on the cache system, a rating of the current selectivity list (i.e., calculate the quality of the current selectivity list and apply the corresponding selectivity function for the given case). Thus, we can apply various selectivity functions F1 for various system "states" where the selectivity period is a function of the load, and the selectivity function shape is itself a function of systems state.

Metrics which may be used for the system state include:
M1—Number of objects cached
M2—Average Hit rate (see below on feedback)
M3—Selective table rating—(how "good" is the selective table)

The selectivity function generator can be either a library of "functions" or derived using a simply generator function that linearizes the period function while using the system "state" for various coefficients.

It may also be desirable to vary the "Selectivity Function Curve" using a feedback system. This is based on the premise that the efficiency of the system may vary as a function of where the installation is. Thus, any two given cache systems may run more or less efficiently as a function of where they are installed. For this case it may be desirable for the cache to detect state metrics, and apply various functions until the optimum is found.

As a result of it being desirable to have different selectivity functions, the timer value is preferably set by a function running in the cache server 150. The cache server 150 also maintains a connection service processes which actually services active connections; that is, it accepts HTTP requests on active connections and provide the requested objects from the cache server 150 once active.

Another consideration is the actual generation of the contents of selectivity connection table (SCT) 430. The selective connection table generation process is preferably performed using an application that scans the cache object table stored in the cache and chooses IP addresses and subnet masks for maximum efficiency. The algorithm used may consider both a number of stored objects weighted by a cache metric (e.g., popularity). For example, one rating for selective IP address/sub-net address combinations can be provided as follows. Assume that a given selective address, K, (aa.bb.xx.xx of the form where aa.bb are the first two portions of the sub-net address and the xx.xx is the mask portion of the address since the last two octets are masked). Also assume that N objects stored in the cache begin with the IP address aa.bb (or some other set described by the address K containing N stored objects). The rating for a selective address K can therefore be defined as the sum of N object metrics $$R_{AK} = M_{01} + M_{02} + M_{03} + \ldots + M_{ON}$$

Hence, when the selective list generation algorithm rates a given address/sub-net combination, it does so based on the sum of the cache metrics (popularity) ratings for that combination.

There are other factors that can be included in this calculation. For example, the number of objects can be favored over the popularity rating as:

$$R_{AK} = (M_{O1} + M_{O2} + M_{O3} + \ldots + M_{ON})/N + cN$$

Dividing the first terms by N yields the average metric for all of the objects contained in the set. This is added to N, times a constant, c, where c is adjusted to provide the proper weight for the number of objects relative to the average metric.

Finally, the sub-net mask can be considered where B equals the number of is set in the mask:

$$R_{AK} = [(M_{O1} + M_{O2} + M_{O3} + \ldots + M_{ON})/N + cN]/dB$$

Dividing by the number of bits (times a constant, d) provides a lower rating for masks that are longer. This allows the most 'focused' sub-net combinations to yield better ratings.

It should be understood, however, that other techniques and algorithms may be used to determine the contents of the selective connection table 430.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a network having at least two nodes, where messages are transferred between nodes on the network, a network apparatus comprising:

a message redirector interposed between nodes that intercepts and processes messages such that selected messages intended for other nodes on the network are marked with connection tags and are redirected to a traffic processor, where a connection corresponding with each connection tag is established for further communications between the node and traffic processor; and a traffic processor linked to the message redirector, the traffic processor decoding received messages to identify connection tags and directing the message to the connection corresponding with the connection tag, thereby bypassing at least one network processing layer in the traffic processor.

2. An apparatus as in claim 1 wherein the connection tag is stored in a link layer of the message.

3. An apparatus as in claim 1 wherein the connection tag is stored in an Ethernet field of the message.

4. An apparatus as in claim 1 wherein the redirector creates a connection and assigns a connection tag based on a TCP and IP address in the message.

5. In a network having at least two nodes, where messages are transferred between nodes on the network, a network apparatus comprising:

message redirector interposed between nodes that intercepts and processes messages such that selected messages intended for other nodes on the network are marked with connection tags and are redirected to a traffic processor, where a connection corresponding with each connection tag is established for further communications between the node and traffic processor; and a traffic processor linked to the message redirector, the traffic processor decoding received messages to identify connection tags and directing the message to the connection corresponding with the connection tag, thereby bypassing at least one network processing layer in the traffic processor, the message redirector maintaining a list of retrievable objects in the traffic processor and redirecting messages to the traffic processor if the object requested by a node is in the traffic processor.

6. An apparatus as in claim 5 wherein the redirector decodes a message to determine if a message pertains to an established connection and, if so, the redirector marking the message with the corresponding connection tag before redirecting the message to the traffic processor.

7. An apparatus as in claim 5 wherein the redirector decodes an address in the message and determines if a connection is open and, if so, the redirector retrieving the corresponding connection tag, marking the message with the connection tag and redirecting the message to the traffic processor.

8. An apparatus as in claim 5 wherein messages regarding HTTP requests get redirected to the traffic processor, the traffic processor copying a requested object into memory and relaying the object to the node requesting the object.

9. An apparatus as in claim 5 wherein the redirector decodes a message intended for a node on the network to determine if the message is an initial request for an object and, if so, the redirector establishing a connection between the traffic processor and node, marking a message with a connection tag corresponding with the connection and redirecting the message to the traffic processor.

10. An apparatus as in claim 9 wherein the redirector detects an initial request for an object by a node on the network based upon content of the message.

11. An apparatus as in claim 9 wherein the redirector detects an initial request for an object by a node based upon a SYN message in the message.

12. An apparatus as in claim 9 wherein the redirector closes a connection based upon content of the message transmitted by the traffic processor.

13. An apparatus as in claim 9 wherein the redirector closes a connection based upon a FIN message in a responding message transmitted by the traffic processor to a node.

14. An apparatus as in claim 9 wherein the traffic processor generates and transmits a message to the redirector indicating that a connection is to be closed.

15. An apparatus as in claim 14 wherein the redirector and traffic processor both maintain corresponding arrays to track connections.

16. An apparatus as in claim 9 wherein the redirector closes a connection after waiting a predetermined time period.

17. An apparatus as in claim 5 wherein an array of connections supports simultaneous transmissions of objects from the traffic processor to nodes on the network.

18. An apparatus as in claim 5 wherein a connection is closed and a connection tag is freed after a predetermined period of time due to inactivity of communication on a connection.

19. In a network having at least two nodes, where messages are transferred between nodes on the network, a network apparatus comprising:

a message redirector interposed between nodes that intercepts and processes messages such that selected messages intended for other nodes on the network are marked with connection tags and are redirected to a traffic processor, where a connection corresponding with each connection tag is established for further communications between the node and traffic processor;

a traffic processor linked to the message redirector, the traffic processor decoding received messages to identify connection tags and directing the message to the connection corresponding with the connection tag, thereby bypassing at least one network processing layer in the traffic processor; and wherein the redirector decodes a message to determine if a message pertains to an established connection and, if so, the redirector marking the message with the corresponding connection tag before redirecting the message to the traffic processor.

20. An apparatus as in claim 19 wherein the redirector decodes an address in the message and determines if a connection is open and, if so, the redirector retrieving the corresponding connection tag, marking the message with the connection tag and redirecting the message to the traffic processor.

21. An apparatus as in claim 19 wherein an array of connections supports simultaneous transmissions of objects from the traffic processor to nodes on the network.

22. An apparatus as in claim 14 wherein the redirector directs a message to the network when there are no connections available in the array.

23. An apparatus as in claim 19 wherein a connection is closed and a connection tag is freed after a predetermined period of time due to inactivity of communication on a connection.

24. An apparatus as in claim 19 wherein messages regarding HTTP requests get redirected to the traffic processor, the traffic processor copying a requested object into memory and relaying the object to the node requesting the object.

25. In a network having at least two nodes, where messages are transferred between nodes on the network, a network apparatus comprising:

a message redirector interposed between nodes that intercepts and processes messages such that selected messages intended for other nodes on the network are marked with connection tags and are redirected to a traffic processor, where a connection corresponding with each connection tag is established for further communications between the node and traffic processor;

a traffic processor linked to the message redirector, the traffic processor decoding received messages to identify connection tags and directing the message to the connection corresponding with the connection tag, thereby bypassing at least one network processing layer in the traffic processor; and wherein the redirector decodes a message intended for a node on the network to determine if the message is an initial request for an object and, if so, the redirector establishing a connection between the traffic processor and node, marking a message with a connection tag corresponding with the connection and redirecting the message to the traffic processor.

26. An apparatus as in claim 25 wherein the redirector detects an initial request for an object by a node on the network based upon content of the message.

27. An apparatus as in claim 25 wherein the redirector detects an initial request for an object by a node based upon a SYN message in the message.

28. An apparatus as in claim 25 wherein the redirector closes a connection based upon content of the message transmitted by the traffic processor.

29. An apparatus as in claim 25 wherein the redirector closes a connection based upon a FIN message in a responding message transmitted by the traffic processor to a node.

30. An apparatus as in claim 25 wherein the traffic processor generates and transmits a message to the redirector indicating that a connection is to be closed.

31. An apparatus as in claim 30 wherein the redirector and traffic processor both maintain corresponding arrays to track connections.

32. An apparatus as in claim 25 wherein the redirector closes a connection after waiting a predetermined time period.

33. In a network having at least two nodes, where communications in the form of messages are transmitted between nodes on the network, a network apparatus comprising:

a first message processor interposed between nodes that intercepts and processes messages transmitted from a first node to a second node, wherein the first message processor marks each message of a related stream of messages with a tag; and a second message processor linked to the first message processor that receives messages intended for the second node but which are redirected by the first message processor to the second message processor, the second message processor decoding the tag marking each message received from the first message processor to identify the related stream of messages.

34. An apparatus as in claim 33 wherein the first message processor decodes an address in the message and determines if a message corresponds to a related stream of messages and, if so, the first message processor retrieving the tag corresponding to the related stream of messages, marking the message with the tag and redirecting the message to the second message processor.

35. An apparatus as in claim 33 wherein the first message processor decodes a message intended for a node on the network to determine if the message is an initial request for an object and, if so, the first message processor establishing a connection between the second message processor and node, marking the message with a tag corresponding to the related stream of data and redirecting the message to the second message processor.

36. An apparatus as in claim 35 wherein the first message processor detects an initial request for an object by a node on the network based upon content of the message.

37. An apparatus as in claim 35 wherein the first message processor detects an initial request for an object by a node based upon a SYN message.

38. An apparatus as in claim 35 wherein the first message processor closes a connection based upon content of the message transmitted by the second message processor.

39. An apparatus as in claim 33 wherein the first message processor directs a message to the network when there are no resources available in the second message processor to process a related stream of messages.

40. An apparatus as in claim 33 wherein the tag is stored in a link layer of the message.

41. An apparatus as in claim 33 wherein the tag is stored in an Ethernet field of the message.

42. In a network having at least two nodes, where communications in the form of messages are transmitted between nodes on the network, a network apparatus comprising:

a first message processor interposed between nodes that intercepts and processes messages, wherein the first message processor marks each message of a related stream of messages with a tag; and a second message processor linked to the first message processor, the second message processor decoding the tag marking each message received from the first message processor to identify the related stream of messages; and wherein the first message processor decodes an address in the message and determines if a message corresponds to a related stream of messages and, if so, the first message processor retrieving the tag corresponding to the related stream of messages, marking the message with the tag and redirecting the message to the second message processor.

43. In a network having at least two nodes, where communications in the form of messages are transmitted between nodes on the network, a network apparatus comprising:

a first message processor interposed between nodes that intercepts and processes messages, wherein the first message processor marks each message of a related stream of messages with a tag;

a second message processor linked to the first message processor, the second message processor decoding the tag marking each message received from the first message processor to identify the related stream of messages; and wherein the first message processor decodes a message intended for a node on the network to determine if the message is an initial request for an object and, if so, the first message processor establishing a connection between the second message processor and node, marking the message with a tag corresponding to the related stream of data and redirecting the message to the second message processor.

44. An apparatus as in claim 43 wherein the first message processor detects an initial request for an object by a node on the network based upon content of the message.

45. An apparatus as in claim 43 wherein the first message processor detects an initial request for an object by a node based upon a SYN message.

46. An apparatus as in claim 43 wherein the first message processor closes a connection based upon content of the message transmitted by the second message processor.

47. In a network having at least two nodes, where communications in the form of messages are transmitted between nodes on the network, a network apparatus comprising:

a first message processor interposed between nodes that intercepts and processes messages, wherein the first message processor marks each message of a related stream of messages with a tag;

a second message processor linked to the first message processor, the second message processor decoding the tag marking each message received from the first message processor to identify the related stream of messages; and wherein the first message processor directs a message to the network when there are no resources available in the second message processor to process a related stream of messages.

\* \* \* \* \*